United States Patent [19]

Taddei

[11] Patent Number: 4,681,411

[45] Date of Patent: Jul. 21, 1987

[54] EYEGLASS NOSEPIECE HOLDER

[75] Inventor: Lorenzo Taddei, Mantova, Italy

[73] Assignee: Comet - Construzione Occhiali Metallo S.p.A., Volta Mantovana MN, Italy

[21] Appl. No.: 785,634

[22] Filed: Oct. 8, 1985

[30] Foreign Application Priority Data

Oct. 19, 1984 [IT] Italy .................... 18119 A/84

[51] Int. Cl.$^4$ .......................... G02C 5/12; G02C 1/00
[52] U.S. Cl. ........................ 351/137; 351/77; 351/80; 351/88; 351/138
[58] Field of Search .............. 351/76, 77, 88, 137, 351/78, 79, 80, 81, 82, 132, 138

[56] References Cited

U.S. PATENT DOCUMENTS 1,784,013  12/1930  Kern .................... 351/137 X

FOREIGN PATENT DOCUMENTS 869874  6/1961  United Kingdom ........ 351/137

*Primary Examiner*—Rodney B. Bovernick
*Attorney, Agent, or Firm*—Guido Modiano; Albert Josif

[57] ABSTRACT

The eyeglasses nosepiece holder comprises an insert projecting from the nosepiece and having a shank associated with a spherical element adapted to be inserted into a recess having an outer rim and being formed in a body made of elastically deformable material. The body is adapted to be connected to an eyeglasses frame, pins being provided for location in a cutout and a niche respectively for delimiting rotational movement of the spherical element in the recess.

7 Claims, 3 Drawing Figures

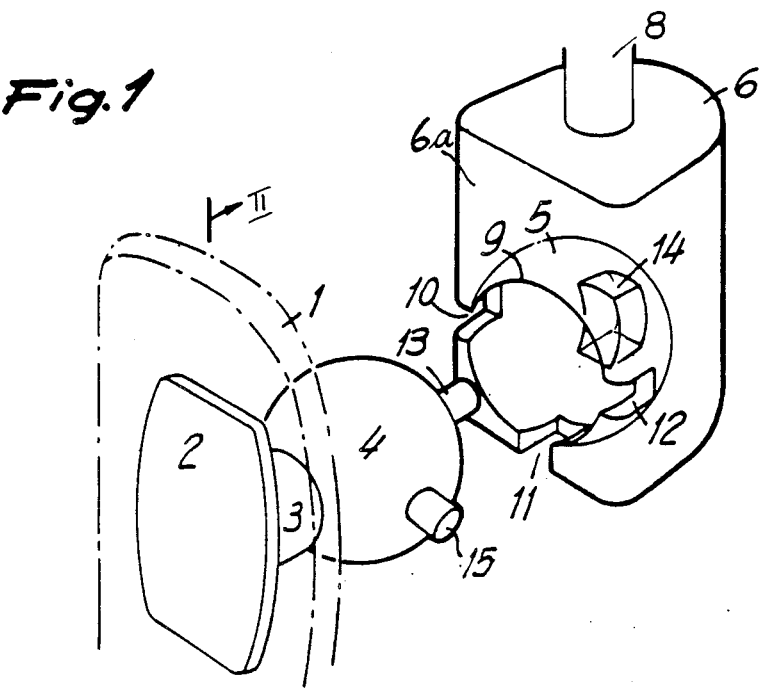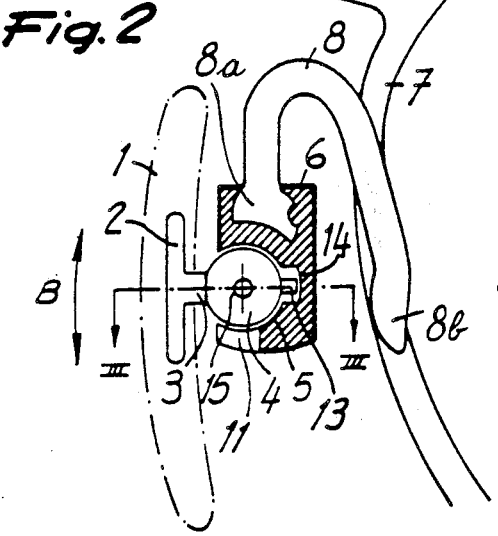

EYEGLASS NOSEPIECE HOLDER

BACKGROUND OF THE INVENTION

The present invention relates to an eyeglasses nosepiece holder.

It is known that the structures of many types of eyeglasses frames are adapted to permit the frame to rest on the bridge of the user's nose through swivelling plate-like elements or nosepieces usually mounted to the lens bezels.

The connection of the nosepieces to the eyeglass frame has been implemented either with a fixed connection or a pivotal connection so as to allow them to pivot about a single axis, usually in a plane extending substantially perpendicular to the lens bezels.

However, in practice, such that prior types, of swivel connection are less than fully satisfactory from the functional standpoint in that they fail to permit the nosepieces to assume a perfect rest position on the bridge of the user's nose.

SUMMARY OF THE INVENTION

Accordingly, it is a primary aim of this invention to provide an eyeglasses nosepiece holder associable with an eyeglasses frame and a nosepiece which permits the nosepiece to assume a perfect rest position on the bridge of the user's nose.

Within this aim, it is an object of the invention to provide an eyeglasses nosepiece holder which is structurally simple and easy to assemble, thereby inherently affording appreciable cost savings.

The above aim, this and other objects which will be apparent hereinafter are achieved by an eyeglass nosepiece holder, according to the present invention, characterized in that it comprises projecting a member associable with a nosepiece, a shank having associated therewith at an end thereof, a spherical element adapted to be fitted into a recess formed in a body of elastically deformable material and connectable to an eyeglasses frame, means being provided to enable limited rotational movement of said spherical element within said recess.

BRIEF DESCRIPTION OF THE DRAWINGS

Further features and advantages will be apparent from the following description of a preferred but not exclusive embodiment of this invention, to be read in conjunction with the accompanying illustrative, non-limitative drawings, where:

FIG. 1 is an exploded perspective view of the nosepiece holder according to the invention with a nosepiece indicated in phantom lines and showing the insert as suitably positioned before being fitted into the recess;

FIG. 2 is a partly sectional view of the nosepiece holder as taken on the plane II—II of FIG. 1, showing the spherical portion inserted into the recess and a hook-like element attached to an eyeglasses frame; and FIG. 3 is a partly sectional top plan view of the nosepiece holder as taken on the plane III—III of FIG. 2.

DESCRIPTION OF THE PREFERRED EMBODIMENT

With reference to the drawing figures, indicated at 1 is the eyeglasses nosepiece shown in phantom lines in the drawing figures for reasons of clarity wherein the enlarged end or plate member 2 associated with a shank 3 is embedded, said shank 3 extends substantially perpendicularly from the nosepiece or nose pad and terminates at a spherical element 4 or ball element.

This spherical element is adapted to be fitted into and retained in a recess 5 formed in a socket body 6, made of an elastically deformable material, and adapted to be connected to the bezel 7 of an eyeglasses frame, for example through a hook or hook-like element 8 defining an arm member which advantageously has an enlarged end portion 8a embedded in said body 6 and an end portion 8b welded or otherwise fixed to said bezel. In practice, as visible, the ball element and the socket body define a ball-socket connection.

More precisely, the recess 5 has the form of a portion of a sphere having a major internal diameter substantially corresponding to the external diameter of the spherical element 4 and which is greater than a hemisphere but smaller than a complete sphere, or a sphere as truncated by a plane containing a wall 6a of the body 6. The recess 5 is inwardly delimited by its curved inner surface and outwardly delimited by a circular rim 9 defined at the wall 6a of the body 6 and forming an introduction mouth which, as can be deduced in particular from FIGS. 2 and 3, has a width smaller than the diameter of the ball element 4.

Thus the circular rim 9 has a smaller diameter than the spherical element 4 which, in assembling the nosepiece holder, is inserted into the recess 5. The insertion of the part-spherical element 4 into the recess 5 is achieved by elastic deformation of the body 6 particularly at the opening of the recess corresponding to a rim 9, whereat cutouts 10,11,12 are formed the former two of which merely serve to improve the elastic deformability of the body 6 at the rim 9, whereas the latter, in addition to this same function, also performs a further function to be explained hereinafter.

The spherical element 4 is rotatable within the recess 5 but the extent of its movement or excursion is advantageously restricted by means presently to be described, which means comprise a pin 13, extending radially from the spherical element 4 at a portion thereof substantially opposite the shank 3 and defining a longitudinal extension or length substantially coaxial with the shank 3, said pin 13 being adapted to fit into a substantially rectangular niche or notch formation 14 having a depth dimension substantially corresponding to or being greater than the longitudinal extension of the pin 13, having length and width dimensions, both of which are greater than the diameter or cross dimension of the pin 13 and being formed at the rear curved surface of the recess 5, thus the pin 13 is permitted to freely move within the niche 14.

Also provided is a guide pin 15 which extends radially from a lateral portion of the spherical element 4 and has a longitudinal axis adapted to lie parallel to one side of the niche 14 and substantially perpendicular to the axes of the shank 3 and the pin 13, the guide pin 15 being adapted to fit, advantageously into the cutout 12.

Thus, the spherical element 4 can perform limited rotational movements about two orthogonal axes, one lying on a perpendicular plane to the shank 3 and another axis being co-axial thereto, precisely, rotation in the direction of the arrow B (FIG. 2) about the axis of the guide pin 15 as delimited by the pin 13 striking the top and bottom faces of the niche 14, and rotation in the direction of the arrow C (FIG. 3) about an axis 16, extending orthogonally to the axis of the guide pin 15, as delimited by the pin 13 striking the lateral faces of the cutout 14 while the guide pin 15 is sliding along the cutout 12. Obviously, any convenient arrangement and number of guide pins and cutouts may be utilized to obtain sufficient elastic deformability of the rim of the recess and to provide sufficient angular displacement of the spherical element therein. For instance one or more guide pins may be provided in addition to or instead of the guide pin 15 for location in one or both of the cutouts 10,11. Furthermore the niche may be conformed in accordance with the adopted combination of pins and cutouts and may define any suitable form, for example circular or square. By way of example, the arrangement shown in the drawing can provide for an angular rotation of 27° along the direction of the arrow B and an angular rotation of 13° along the direction of the arrow C.

The combination of these two rotational movements permits the nosepiece 1 to assume a perfect rest position on the bridge of a user nose to ensure a perfect fit of the eyeglass frame. It is important to observe that the provision of the pin 15 is effective to prevent rotation about the axis of the shank 3, such as would be undoubtedly inconvenient as the nosepiece assume a rest position.

As may be seen, those two axes about which the holder allows the spherical element 4 to turn extend parallel to the sides of the rectangular cutout 14.

Now, in the embodiment shown in the drawing, the last-mentioned sides, and hence the pivot axes, extend substantially parallel and perpendicular, respectively, to the plane of the lens bezels, for the reason that this configuration has been judged to be the best for an optimum adaptation of the nosepiece in connection with its shape and the overall design of the eyeglasses; it is evident, however, that the invention envisages any inclination angle to be adopted for the sides of the cutout 14 with respect to said bezel 7.

The invention herein is susceptible to many modifications and variations without deviating from the true scope of the inventive concept; thus, as a further example, the guide pin 15 could be arranged to extend from the spherical element 4 at a different position from that shown, such that it may be inserted, rather than into the cutout 12, into either of the cutouts 10 or 11, and the body 6 could be connected to the eyeglass frame in any desired manner to suit individual aesthetic and functional demands.

In practicing the invention, all of the details may be replaced with technical equivalents elements, and the materials used, as well as the shapes and dimensions, be any appropriate ones.

I claim:

1. An eyeglass nosepiece holder comprising a ball-socket connection for removably connecting a nosepiece to an eyeglass frame,
    said ball-socket connection including:
    a ball element having an outer substantially spherical shape defining a ball element diameter and an outer surface area,
    first and second pin elements projecting from said outer substantially spherical shape of said ball element and being rigid with said ball element, said first and second pin elements having respectively first and second pin element cross dimensions and said second pin element definining a second pin element rotation axis,
    a socket body made of elastically deformable material and having an outer delimitation wall,
    an internal recess in said socket body for accomodating therein said ball element, said internal recess having an introduction mouth formed in said outer delimitation wall of said socket body and an internal partially cut away spherical shape defining a recess diameter substantially equal to said ball element diameter, said introduction mouth having a width smaller than said ball element diameter and said internal partially cut away spherical shape having an inner surface area greater than half of said outer substantially spherical shape of said ball element,
    a notch formation extending from said recess within said socket body and having lateral delimitation walls defining a notch formation cross dimension greater than said first pin element cross section, said notch formation accomodating said first pin element and said lateral delimitation walls defining a lateral stop for said first pin element, and
    a first lateral cutout extending from said introduction mouth of said internal recess in said socket body and from said outer delimitation wall of said socket body to said internal recess, said first lateral cutout having a bottom delimitation wall opposed to said introduction mouth and two lateral delimiting walls, said lateral delimiting walls fittingly accomodating said second pin element cross dimension,
    thereby said socket body made of elastically deformable material together with at least said first lateral cutout defining a snap engagement member for said ball element, and said notch formation allowing a limited movement of said first pin element within said notch formation and a limited rotation of said ball element with said internal recess with said second pin element sliding along said first lateral cutout and rotating around said second pin element rotation axis.

2. An eyeglass nosepiece holder comprising a ball-socket connection for removably connecting a nosepiece to an eyeglass frame,
    said ball-socket connection including:
    a ball element having an outer substantially spherical shape defining a ball element diameter and an outer surface area,
    first and second pin elements projecting from said outer substantially spherical shape of said ball element and being rigid with said ball element, said first pin element having a first pin element cross dimension and a first pin element length and said second pin element having a second pin element rotation axis,
    a socket body made of elastically deformable material and having an outer delimitation wall,
    an internal recess in said socket body for accomodating therein said ball element, said internal recess having an introduction mouth formed in said outer delimitation wall of said socket body and an internal partially cut away spherical shape defining a recess diameter substantially equal to said ball element diameter, said introduction mouth having a width smaller than said ball element diameter and said internal partially cut away spherical shape having an inner surface area greater than half of said outer substantially spherical shape of said ball element,
    a notch formation extending from said recess within said socket body and having lateral delimitation walls, said notch formation having a notch depth at least equal to said first pin length and a notch cross dimension greater than said first pin element cross dimension, said notch formation accomodating said first pin element and said lateral delimiting walls forming a lateral stop for said first pin element, a first lateral cutout extending from said introduction mouth of said internal recess in said socket body and from said outer delimitation wall of said socket body to said internal recess, said first lateral cutout having a bottom delimitation wall opposed to said introduction mouth and two lateral delimiting walls fittingly accomodating said second pin element, and at least a second lateral cutout extending from said introduction mouth of said internal recess in said socket body and from said outer delimitation wall of said socket body to said internal recess, laterally to said first lateral cutout, thereby said socket body made of elastically deformable material together with said first and second lateral cutouts defining a snap engagement member for said ball element, and said notch formation allowing a limited movement of said first pin element within said notch formation and a limited rotation of said ball element within said internal recess with said second pin element sliding along said first lateral cutout and rotating around said second pin element rotation axis.

3. An holder according to claim 2, wherein said first and second pin element extend radially from said ball element.

4. An holder according to claim 2, wherein said first pin element extends coaxially and diametrically opposed to said shank portion and said second pin element extends perpendicularly to said first pin element, said notch formation faces said internal recess in opposed relationship to said introduction mouth and has a substantially parallelepipedal shape with said lateral delimitation walls including first two mutually opposed delimitation walls extending substantially parallel to said second pin element and second two mutually opposed delimitation walls extending substantially perpendicularly to said first two delimitation walls.

5. An eyeglass nosepiece holder comprising a ball-socket connection for removably connecting a nosepad to an eyeglass frame, said ball-socket connection including:

a ball element having an outer substantially spherical shape defining a ball element diameter and an outer surface area, a shank portion having a first end and a second end, said first end of said shank portion being rigid with said ball element, a plate member rigidly attached to said second end of said shank portion and extending cross-wise to said shank portion for connection to a nose pad, first and second pin elements projecting from said outer substantially spherical shape of said ball element and being rigid with said ball element, said first pin element having a first pin element cross dimension and a first pin element length and said second pin element having a second pin element rotation axis, a socket body made of elastically deformable material and having an outer delimitation wall, an arm member having a first arm member end rigidly connected to said socket body and a second arm member end for connection to an eyeglass frame, an internal recess in said socket body for accomodating therein said ball element, said internal recess having an introduction mouth formed in said outer delimitation wall of said socket body and an internal partially cut away spherical shape defining a recess diameter substantially equal to said ball element diameter, said introduction mouth having a width smaller than said ball element diameter and said internal partially cut away spherical shape having an inner surface area greater than half of said outer substantially spherical shape of said ball element, a notch formation extending from said recess within said socket body and having lateral delimitation walls, said notch formation having a notch depth at least equal to said first pin length and a notch cross dimension greater than said first pin element cross dimension, said notch formation accomodating said first pin element and said lateral delimiting walls forming a lateral stop for said first pin element, a first lateral cutout extending from said introduction mouth of said internal recess in said socket body and from said outer delimitation wall of said socket body to said internal recess, said first lateral cutout having a bottom delimitation wall opposed to said introduction mouth and two lateral delimiting walls fittingly accomodating said second pin element, and at least a second lateral cutout extending from said introduction mouth of said internal recess in said socket body and from said outer delimitation wall of said socket body to said internal recess, laterally to said first lateral cutout, thereby said socket body made of elastically deformable material together with said first and second lateral cutouts defining a snap engagement member for said ball element, and said notch formation allowing a limited movement of said first pin element within said notch formation and a limited rotation of said ball element within said internal recess with said second pin element sliding along said first lateral cutout and rotating around said second pin element rotation axis.

6. An holder according to claim 5, wherein said first and second pin element extend radially from said ball element.

7. An holder according to claim 5, wherein said first pin element extends coaxially and diametrically opposed to said shank portion and said second pin element extends perpendicularly to said first pin element, said notch formation faces said internal recess in opposed relationship to said introduction mouth and has a substantially parallelepipedl shape with said lateral delimitation walls including first two mutually opposed delimitation walls extending substantially parallel to said second pin element and second two mutually opposed delimitation walls extending substantially perpendicularly to said first two delimitation walls.

* * * * *